April 23, 1940.  J. J. ADAM  2,198,522
BRAKE APPARATUS
Filed July 18, 1939   2 Sheets-Sheet 1

Inventor
JOE J. ADAM,
By Clarence A. O'Brien
and Hyman Berman
Attorneys

April 23, 1940.  J. J. ADAM  2,198,522
BRAKE APPARATUS
Filed July 18, 1939  2 Sheets-Sheet 2
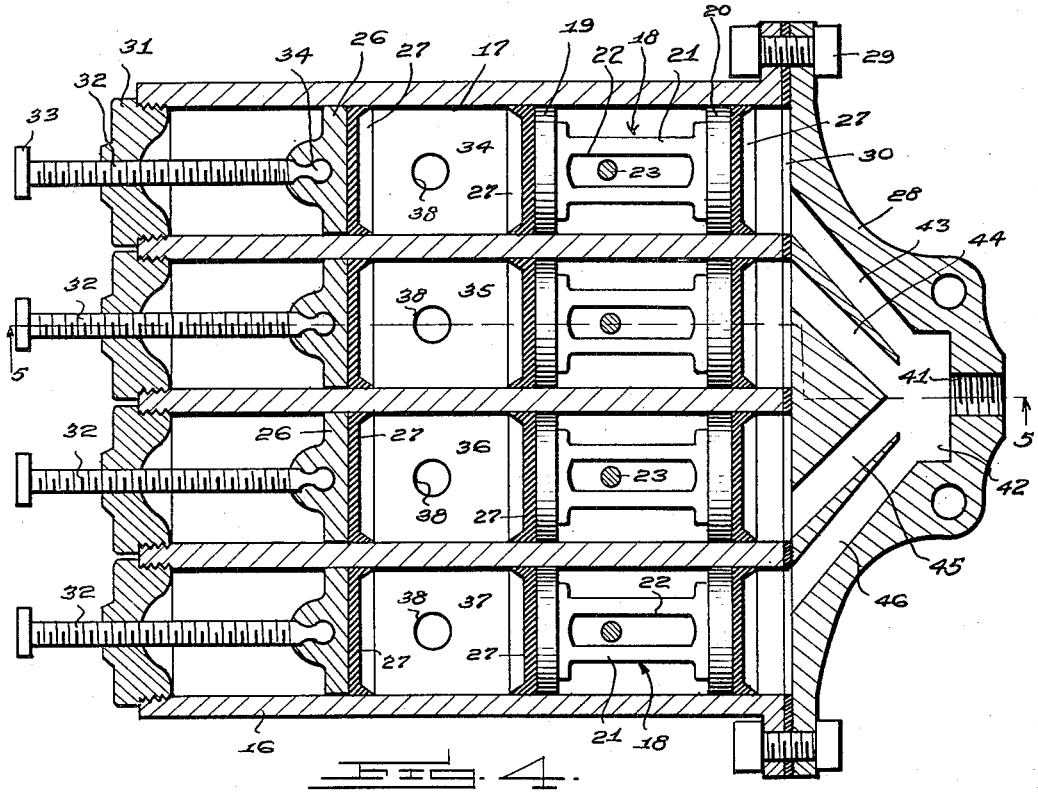
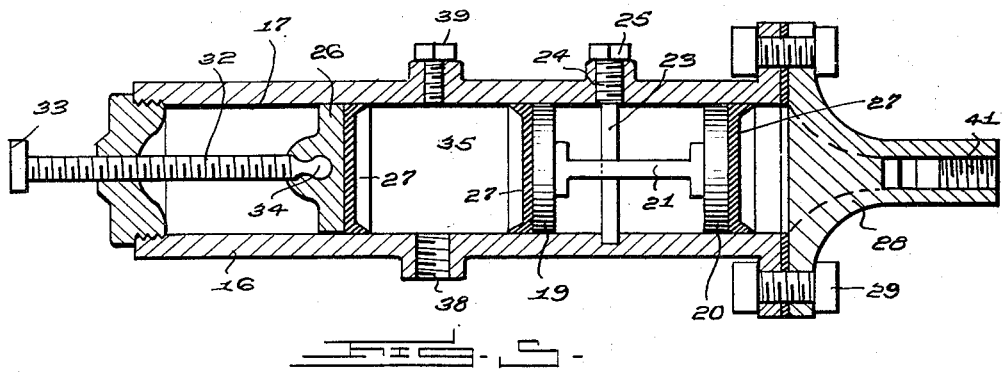
Inventor
JOE J. ADAM,
By Clarence A. O'Brien
and Hyman Berman
Attorneys Patented Apr. 23, 1940

2,198,522

UNITED STATES PATENT OFFICE 2,198,522

BRAKE APPARATUS

Joe J. Adam, Lacoste, Tex.

Application July 18, 1939, Serial No. 285,155

3 Claims. (Cl. 303—84)

This invention appertains to new and useful improvements in hydraulic brakes such as are commonly used on motor vehicles.

The principal object of the present invention is to provide a hydraulic brake system wherein a safety factor is involved which will prevent the entire system from becoming inoperative when one brake line becomes defective.

Another important object of the invention is to provide a brake system of the character stated wherein the parts are readily accessible for the purpose of repair or replacement.

These and various other important objects and advantages of the invention will become apparent to the reader of the following specification.

In the drawings:

Figure 4 is a horizontal sectional view through the equalizer.

Figure 5 is a section on the line 5—5 of Figure 4.

Figure 1:
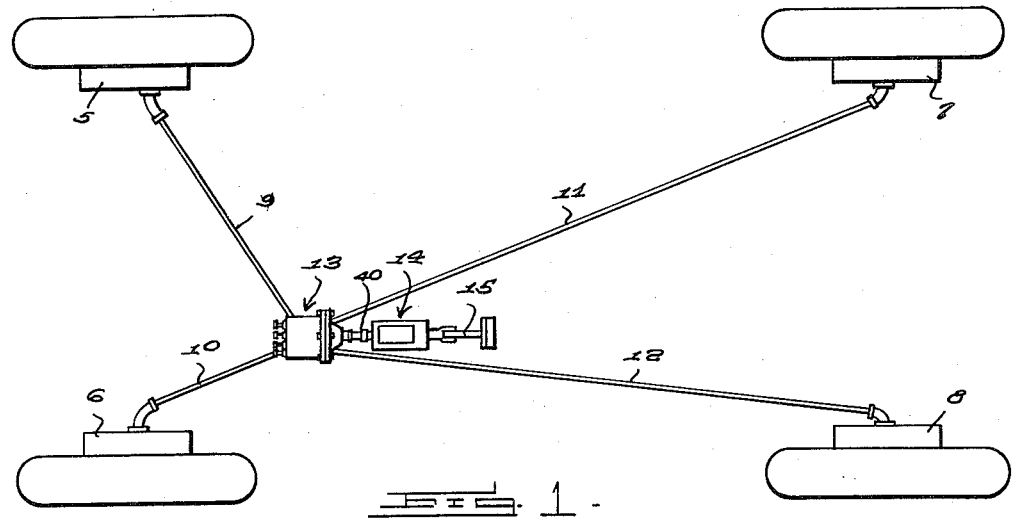
Figure 1 represents a diagrammatic view disclosing the various elements of the system.
Figure 2:
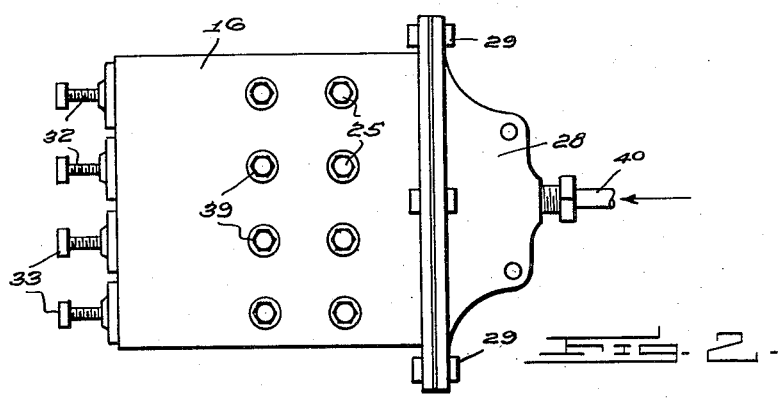
Figure 2 is a top plan view of the equalizer.
Figure 3:
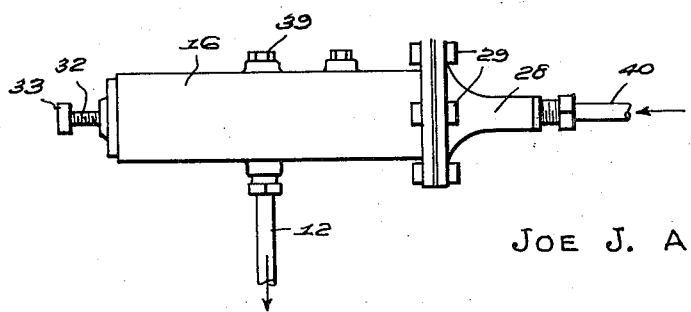
Figure 3 is a side elevational view of the equalizer.

Referring to the drawings wherein like numerals designate like parts, it can be seen in Figure 1, that numerals 5, 6, 7 and 8 represent the four brakes of a four-wheeled vehicle, while the lines 9, 10, 11 and 12 extend from the novel equalizer generally referred to by numeral 13 to these brakes, respectively.

Numeral 14 generally refers to the master cylinder which is operated by the usual brake pedal 15.

The improved safety equalizer consists of the block 16 which is bored longitudinally to form a plurality of cylinders 17 in each of which is operative a piston assembly 18 consisting of the two piston heads 19—20 connected to operate as a unit by the connector 21. This connector 21 has a longitudinally extending slot 22 therein through which projects the stop pin 23. Each of these stop pins 23 has a threaded end portion 24 terminating in a wrench engageable head 25, this threaded portion 24 being threadedly disposed into the block 16 as shown in Figure 5. Thus the extent of movement of the piston unit 18 is limited.

In each of the cylinders 17 and cooperative with the corresponding piston unit 18 is an adjustable piston 26. The pistons 19 and 26 as well as the piston 20 carry packing elements 27.

One end of the block 16 has the head 28 secured thereto by a bolt 29 and between this head 28 and the block 16 is a gasket 30.

Threadedly disposed into each cylinder 17 at the opposite end of the block 16 is a threaded plug 31 through which is threadedly disposed a screw shaft 32, the same having a head 33 at its outer end while its inner end is swivelly connected as at 34 to the corresponding piston 26.

The lines 9, 10, 11 and 12 communicate with the chambers 34, 35, 36 and 37, respectively, by way of the ports 38. Filler plugs 39 are provided in the top of the cylinder block 16, one for each of the chambers 34, 35, 36 and 37.

A conduit 40 extends from the master cylinder 14 and is threadedly disposed in the threaded opening 41 of the head 28. This threaded opening 41 opens into the small chamber 42 from which ducts 43, 44, 45 and 46 extend to the corresponding cylinders 17.

Obviously, the fluid of the master cylinder 14 operates against the piston unit 18 when the pedal 15 is depressed and these units 18 operate against the fluid in the lines 9, 10, 11 and 12, and the corresponding chambers 34, 35, 36 and 37.

Obviously, when a leak occurs in any one of the lines 9, 10, 11 and 12 only that particular line and its brake will be out of service.

Compensation for brake band wear or loss of oil in any one of the wheel brakes can be accomplished by manipulating the corresponding screw 32 to regulate the position of the corresponding piston 26 in the cylinder 17. Any loss of oil can be replaced by way of the openings normally closed by the filler plugs 39.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a brake system, brake lines, a master cylinder, means for operating the master cylinder, an equalizer to which the lines connect, a conduit between the master cylinder and the equalizer, said equalizer consisting of a cylinder for each of the lines and a piston operative in each of the cylinders, and an adjustable piston in each of the cylinders cooperative with the first-mentioned piston and defining a chamber between the same into which the corresponding brake line communicates, each of the first-mentioned pistons consisting of a pair of piston heads, a connector between the piston heads and stop means for the piston heads.

2. In a brake system, brake lines, a master cylinder, means for operating the master cylinder, an equalizer to which the lines connect, a conduit between the master cylinder and the equalizer, said equalizer consisting of a cylinder for each of the lines and a piston operative in each of the cylinders, and an adjustable piston in each of the cylinders, cooperative with the first-mentioned piston and defining a chamber between the same into which the corresponding brake line communicates, each of the first-mentioned pistons consisting of a pair of piston heads, a connector between the piston heads and stop means for the piston heads, said stop means consisting in providing the connector of each of the first-mentioned piston with a longitudinal slot and a pin disposed into the equalizer and through the corresponding slot.

3. In a brake system, brake lines, a master cylinder, means for operating the master cylinder, an equalizer to which the lines connect, a conduit between the master cylinder and the equalizer, said equalizer consisting of a cylinder for each of the lines and a piston operative in each of the cylinders, an adjustable piston in each of the cylinders cooperative with the first-mentioned piston and defining a chamber between the same to which the corresponding brake line communicates, each of the first-mentioned pistons consisting of a pair of piston heads, a connector between the piston heads, said connector being formed with a logitudinal slot, a stop for the connector, said stop comprising a threaded plug disposed into the side of the equalizer and provided with a smooth pin extending from the inner end thereof and projecting through the slot in the connector.

JOE J. ADAM.